United States Patent
Sadegh et al.

(10) Patent No.: US 10,150,050 B2
(45) Date of Patent: Dec. 11, 2018

(54) SOLAR POWERED WATER PURIFICATION DEVICE WITH CYLINDRICAL STRUCTURE

(71) Applicants: Research Foundation of the City University of New York, New York, NY (US); Sun Fresh Water, LLC, Ormond Beach, FL (US)

(72) Inventors: Ali M. Sadegh, Franklin Lakes, NJ (US); Jorge E. Gonzalez-Cruz, Baldwin, NY (US); Joseph James D'Alba, Ormond Beach, FL (US); George Victor St. Pierre, Ormond Beach, FL (US)

(73) Assignees: Research Foundation of the City University of New York, New York, NY (US); Sun Fresh Water, LLC, Ormond Beach, FL (US)

( * ) Notice: Subject to any disclaimer, the term of this patent is extended or adjusted under 35 U.S.C. 154(b) by 0 days.

(21) Appl. No.: 15/628,890

(22) Filed: Jun. 21, 2017

(65) Prior Publication Data

US 2017/0291118 A1 Oct. 12, 2017

Related U.S. Application Data

(63) Continuation-in-part of application No. 14/969,076, filed on Dec. 15, 2015.

(Continued)

(51) Int. Cl.
*B01D 1/04* (2006.01)
*B01D 1/00* (2006.01)
(Continued)

(52) U.S. Cl.
CPC ............ *B01D 1/0035* (2013.01); *B01D 1/04* (2013.01); *B01D 3/02* (2013.01); *B01D 3/085* (2013.01);
(Continued)

(58) Field of Classification Search
CPC ...... B01D 1/00; B01D 1/0011; B01D 1/0029; B01D 1/0035; B01D 3/02; B01D 5/0066; C02F 1/14
See application file for complete search history.

(56) References Cited

U.S. PATENT DOCUMENTS 2,402,737 A 6/1946 Delano
3,501,381 A 3/1970 Delano
(Continued)

OTHER PUBLICATIONS http://mathworld.wolfram.com/HorizontalCylindricalSegment.html (accessed Jun. 22, 2018).*
Kalogirou, Soteris; Use of parabolic trough solar energy collectors for sea-water desalination; Applied Energy; 1998; pp. 65-88; vol. 60; Elsevier.
(Continued)

*Primary Examiner* — Renee Robinson
*Assistant Examiner* — Derek N Mueller
(74) *Attorney, Agent, or Firm* — Peter J. Mikesell; Schmeiser, Olsen & Watts, LLP

(57) ABSTRACT

A device for purifying water by solar power is described. The device has bottom and top sections, each being half-cylinders contacting one another along a flat edge to provide an elongated cylinder. The bottom section has an evacuated area with an optically transparent bottom surface that light can pass through to heat a liquid tray in the top section. A side-gutter directs water that condenses on an interior surface of the top section to an output port for collection.

20 Claims, 19 Drawing Sheets

Related U.S. Application Data

(60) Provisional application No. 62/352,706, filed on Jun. 21, 2016, provisional application No. 62/091,888, filed on Dec. 15, 2014, provisional application No. 62/186,779, filed on Jun. 30, 2015.

(51) Int. Cl.

| | |
|---|---|
| *B01D 3/08* | (2006.01) |
| *B01D 3/02* | (2006.01) |
| *C02F 1/14* | (2006.01) |
| *C02F 1/08* | (2006.01) |
| *B01D 5/00* | (2006.01) |
| *C02F 103/08* | (2006.01) |

(52) U.S. Cl.
CPC .............. *B01D 5/0066* (2013.01); *C02F 1/08* (2013.01); *C02F 1/14* (2013.01); *C02F 2103/08* (2013.01); *C02F 2201/009* (2013.01); *Y02A 20/212* (2018.01)

(56) References Cited

U.S. PATENT DOCUMENTS

| | | |
|---|---|---|
| 4,055,707 A | 10/1977 | McDonald |
| 4,327,552 A | 5/1982 | Dukess |
| 4,403,653 A | 9/1983 | Davidson |
| 4,572,161 A | 2/1986 | Mori |
| 4,921,580 A | 5/1990 | Martes et al. |
| 5,053,110 A | 10/1991 | Deutsch |
| 6,607,639 B1 | 8/2003 | Longer |
| 6,761,802 B2 | 7/2004 | Azimi |
| 7,067,044 B1 | 6/2006 | Coon |
| 8,246,787 B2 | 8/2012 | Cap et al. |
| 8,341,961 B2 | 1/2013 | Glynn |
| 8,353,286 B2 | 1/2013 | Li |
| 2010/0294266 A1 | 11/2010 | Fung |
| 2014/0231327 A1 | 8/2014 | D'Alba et al. |

OTHER PUBLICATIONS

Al-Hayek, I. et al; The effect of using different designs of solar stills on water distillation; Desalination; 2004; pp. 121-127; vol. 169; Elsevier.

Ismail, Basel I.; Design and performance of a transportable hemispherical solar still; Renewable Energy; Jul. 2, 2008; pp. 145-150; vol. 34; Elsevier.

Murugavel, K. et al.; Performance study on basin type double slope solar still with different wick materials and minimum mass of water; Renewable Energy; Aug. 25, 2010; pp. 612-620; vol. 36; Elsevier.

Mahdi, J.T. et al.; An experimental wick-type solar still system: Design and construction; Desalination; Nov. 9, 2010; pp. 233-238 vol. 267; Elsevier.

Esfahani, J. et al.; Utilization of thermoelectric cooling in a portable active solar still—An experimental study on winter days; Desalination; Nov. 26, 2010; pp. 198-205 vol. 269; Elsevier.

Ahsan, A. et al.; Design, fabrication and performance analysis of an improved solar still; Desalination; Mar. 13, 2012; pp. 105-112 vol. 292; Elsevier.

Arunkumar, T. et al.; An experimental study on a hemispherical solar still; Desalination; Dec. 21, 2011; pp. 342-348 vol. 286; Elsevier.

Arunkumar, T. et al.; Experimental Study on Various Solar Still Designs; ISRN Renewable Energy; 2012; pp. 1-10; vol. 2012, Article ID 569381.

Forrest, E. et al.; Augmentation of nucleate boiling heat transfer and critical heat flux using nanoparticle thin-film coatings; International Journal of Heat and Mass Transfer; Oct. 31, 2009; pp. 58-67; vol. 53; Elsevier.

Chu, K. et al.; Structured surfaces for enhanced pool boiling heat transfer; Applied Physics Letters; Jun. 11, 2012; pp. 1-4; vol. 100; AIP Publishing.

You, S.M. et al.; Effect of nanoparticles on critical heat flux of water in pool boiling heat transfer; Applied Physics Letters; Oct. 20, 2003; vol. 83, No. 16; American Institute of Physics.

\* cited by examiner

SOLAR POWERED WATER PURIFICATION DEVICE WITH CYLINDRICAL STRUCTURE

CROSS-REFERENCE TO RELATED APPLICATIONS

This application claims priority to and is a non-provisional of U.S. Patent application 62/352,706 (filed Jun. 21, 2016) and also claims priority to and is a continuation-in-part of U.S. patent application Ser. No. 14/969,076 (Dec. 15, 2015) which is a non-provisional of U.S. Patent Application Ser. No. 62/091,888 (filed Dec. 15, 2014) and 62/186,779 (filed Jun. 30, 2015) the entirety of each of which is incorporated herein by reference.

BACKGROUND OF THE INVENTION

The subject matter disclosed herein relates to solar powered desalination devices. Governments in developing countries are challenged to provide sufficient amounts of potable drinking water to their population. In such countries water is often contaminated with salt or microorganisms which presents a health concern. While previous attempts have been made to provide potable water, none of these attempts have proven entirely satisfactory. These attempts often suffer from a lack of sufficient throughput or are too costly. Accordingly, alternative water purification devices are desired.

The discussion above is merely provided for general background information and is not intended to be used as an aid in determining the scope of the claimed subject matter.

BRIEF DESCRIPTION OF THE INVENTION

A device for purifying water by solar power is described. The device has bottom and top sections, each being half-cylinders contacting one another along a flat edge to provide an elongated cylinder. The bottom section has an evacuated area with an optically transparent bottom surface that light can pass through to heat a liquid tray in the top section. A side-gutter directs water that condenses on an interior surface of the top section to an output port for collection.

In a first embodiment, a device for purifying water by solar power is provided. The device comprises a bottom section and a top section, each being half-cylinders contacting one another along a respective flat edge to provide an elongated cylinder; the bottom section comprising a cover that defines the flat edge of the bottom section that is sealed to an optically transparent bottom surface to provide an evacuated area that has a pressure of less than one atmosphere; and the top section comprises a liquid tray that defines the flat edge of the top section, at least one side-gutter that directs water that condenses on an interior surface of the top section to an output port, the liquid tray further comprising an input port for adding water into the liquid tray.

In a second embodiment, a device for purifying water by solar power is provided. The device comprises a bottom section and a top section, each being half-cylinders contacting one another along a respective flat edge to provide an elongated cylinder; the bottom section comprising a cover that defines the flat edge of the bottom section that is sealed to an optically transparent bottom surface to provide an evacuated area that has a pressure of less than one atmosphere; and the top section comprises a liquid tray that defines the flat edge of the top section, the liquid tray being flanked by side-gutters that direct water that condenses on an interior surface of the top section to a front-gutter and through an output port, the side-gutters and the front-gutter at least partially circumscribing the liquid try, the liquid tray further comprising an input port for adding water into the liquid tray.

In a third embodiment, a device for purifying water by solar power. The device comprises a bottom section and a top section, each being half-cylinders contacting one another along a respective flat edge to provide an elongated cylinder; the bottom section comprising a cover that defines the flat edge of the bottom section that is sealed to an optically transparent bottom surface to provide an evacuated area that has a pressure of less than one atmosphere; the top section comprises an optically transparent dome, a liquid tray that defines the flat edge of the top section, the liquid tray being flanked by side-gutters that direct water that condenses on an interior surface of the optically transparent dome to front-gutter and through an output port, the side-gutters and the front-gutter at least partially circumscribing the liquid try, the liquid tray further comprising an input port for adding water into the liquid tray; and an array of lenses disposed above the top section.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 3D is a perspective view of side-gutters (shown in phantom) of the top section while

FIG. 4A is a cross section of the top section from the front showing relative placement of ports while

FIG. 7B is a top view of system showing the array of lenses while FIG. 7C is an end view of the array of lenses;

DETAILED DESCRIPTION OF THE INVENTION

Figure 1:
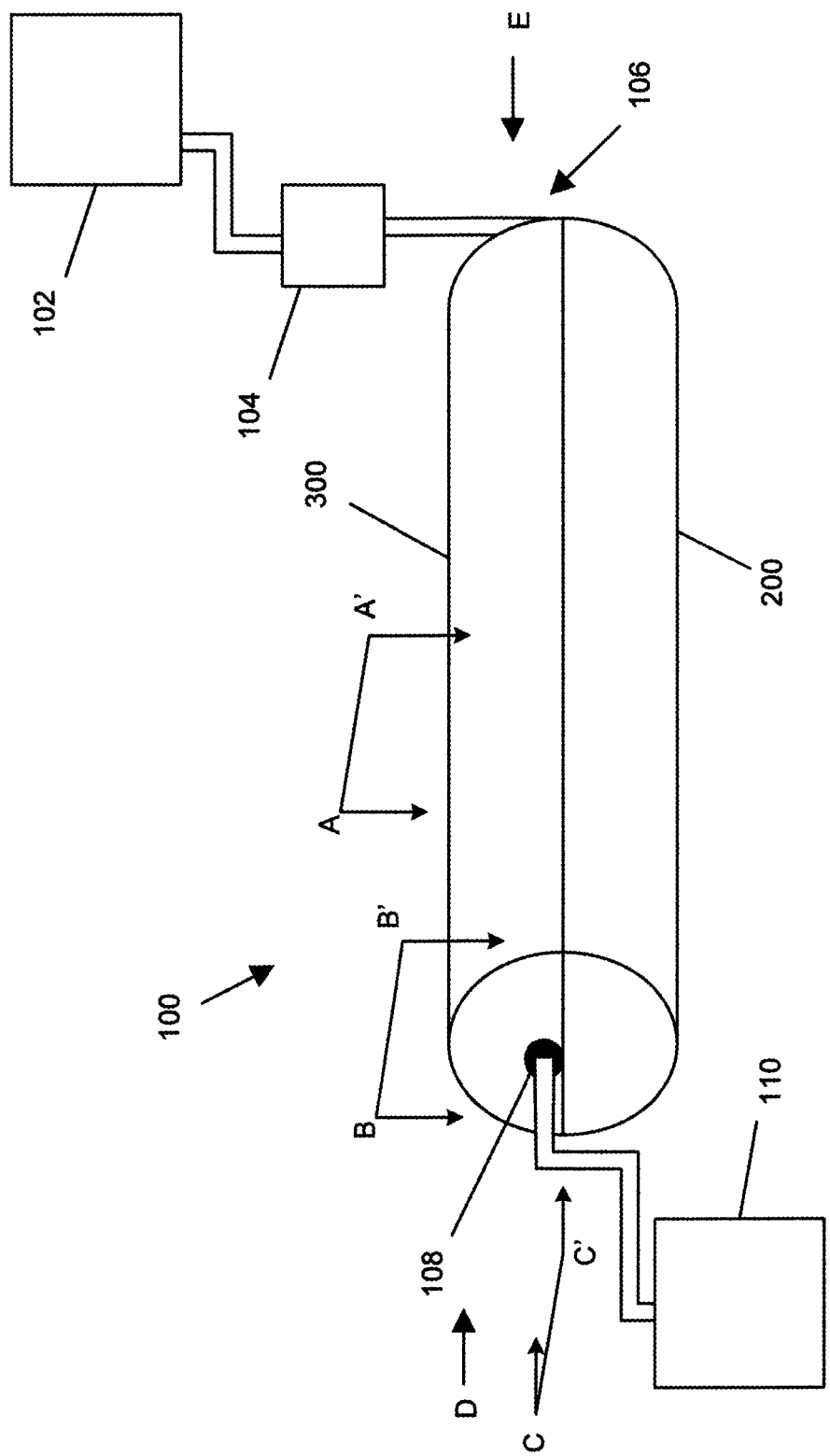
FIG. 1 is a perspective view of a system for purifying water by solar power.

Disclosed in this specification is a solar powered linear desalination tube (LDT) that renders salt water potable for human consumption. FIG. 1 depicts a linear dome solar water purifying device 100. The water purifying device 100 is generally cylindrical and comprises a bottom section 200 and a top section 300. A water reservoir 102 is provided that holds unpurified water. A water flow regulator 104 provides water from the water reservoir 102 to the water purifying device 100 through an input port 106 at a specific rate. The specific rate may be set, for example, by the rate at which the water purifying device 100 purifies water. Examples of suitable water flow regulators include float valves, drip house, spray mechanisms and soaker hoses. The water flow regulator functions to control the rate of water input to roughly correspond to the rate of purified water output. The water flow regulator 104 may be disposed inside of the water purifying device 100 (see FIG. 3A). After the water has been purified, potable water exits outlet port 108 and is collected in water collector 110 for subsequent use. The water purifying device 100 is shown in further detail in subsequent figures.

Figure 2A:
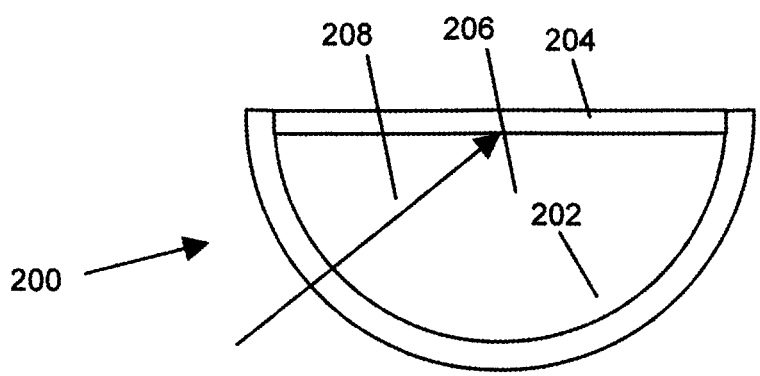
FIG. 2A, FIG. 2B, and FIG. 2C are cross section views of a bottom section of the system.
Figure 2B:
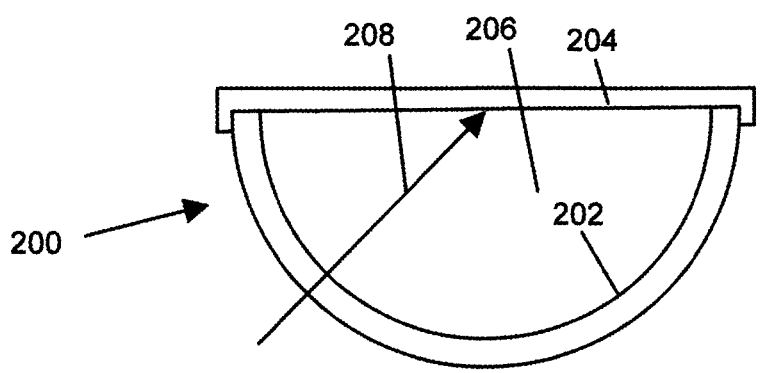
Figure 2C:
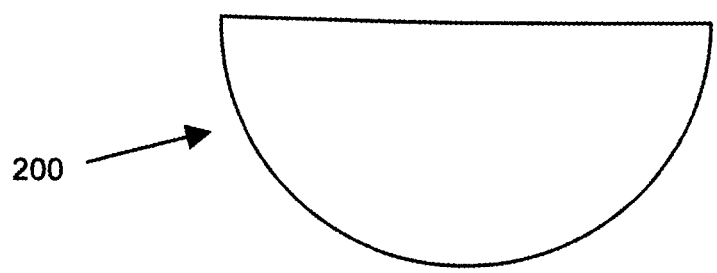

FIG. 2A depicts a cross section along line A-A' of FIG. 1 of the bottom section 200. The bottom section 200 comprises an optically transparent surface 202 and a cover 204. Suitable optically transparent materials include glass, acrylics (such as acrylics sold under the brand name PLEXIGLASS), polycarbonates (such as polycarbonates sold under the brand name LEXAN or MAKROLON) and other plastics. The cover 204 may be an optically transparent cover or an opaque, metallic cover that is thermally conductive. FIG. 2A and FIG. 2B differ in the mode of attachment of the cover 204. In FIG. 2A, the cover 204 is encompassed within the mouth of the optically transparent surface 202. In FIG. 2B, the cover 204 extends over the mouth of the optically transparent surface 202 to overhang a side of the optically transparent surface 202. An airtight sealant may be used to main a vacuum within the bottom surface 202. In another embodiment, the cover 204 of bottom section 200 and the bottom of top section 300 are monolithic and consist of aluminum or other metallic material that is sealed to the optically transparent bottom surface 202 to allow for evacuation of evacuated area 206. The cover 204 forms an airtight seal with the optically transparent surface 202 so as to form an evacuated area 206. The evacuated area 206 has been substantially evacuated of air such that the pressure within the evacuated area 206 is less than 0.8 atmosphere. In one embodiment, the pressure within the evacuated area 206 is less than 0.5 atmosphere. In another embodiment, the pressure within the evacuated area 206 is less than 0.1 atmosphere. Light 208 is transmitted through the optically transparent bottom surface 202 where it strikes the cover 204. In one embodiment, a parabolic mirror (see parabolic mirror 600 of FIG. 6) is used to direct the light 208. FIG. 2B is an end view of the bottom section 200 along line B-B' (see FIG. 1) showing a solid proximate end. The distal end of the bottom section 200 also has such a solid end.

Figure 3A:
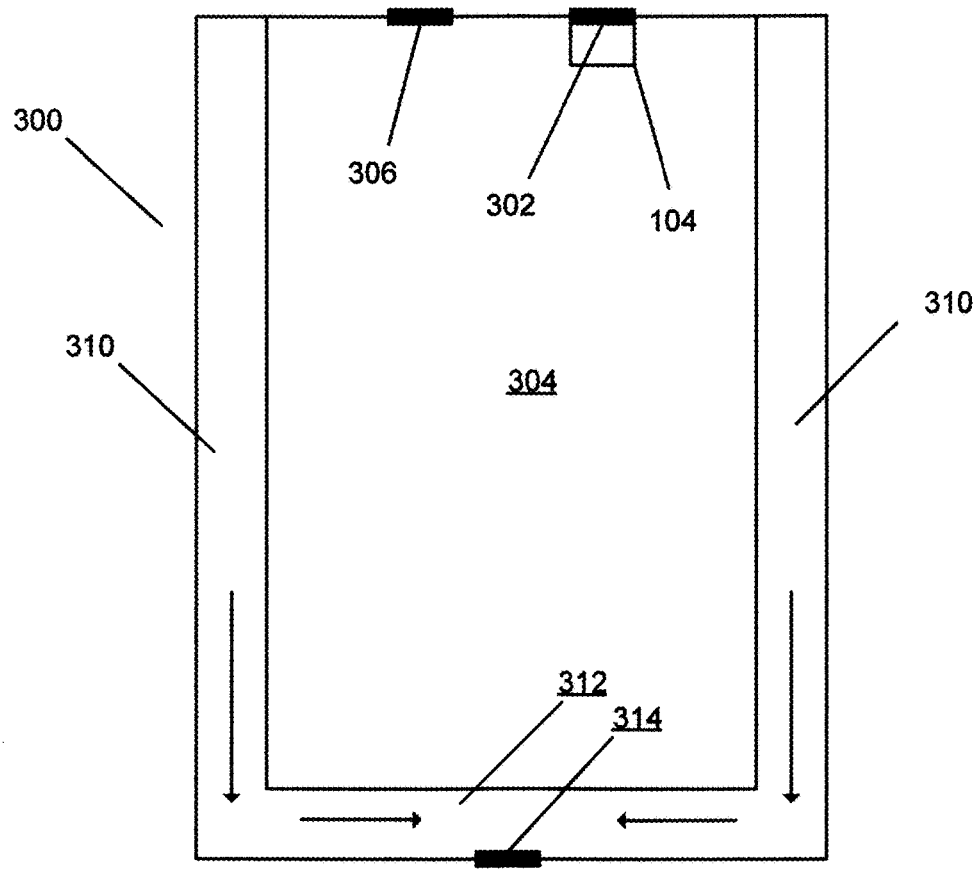
FIG. 3A is a cross section of a top section of the system from the top while FIB. 3B is a cross section of the top section from the side.
Figure 3B:
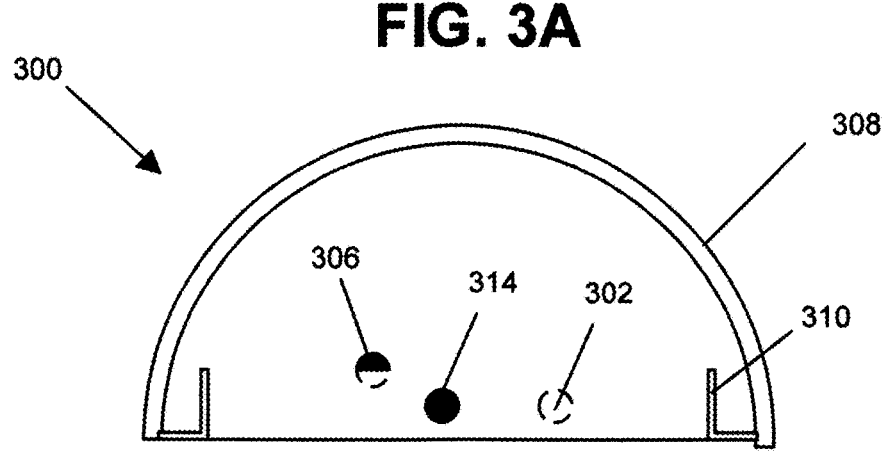
Figure 3C:
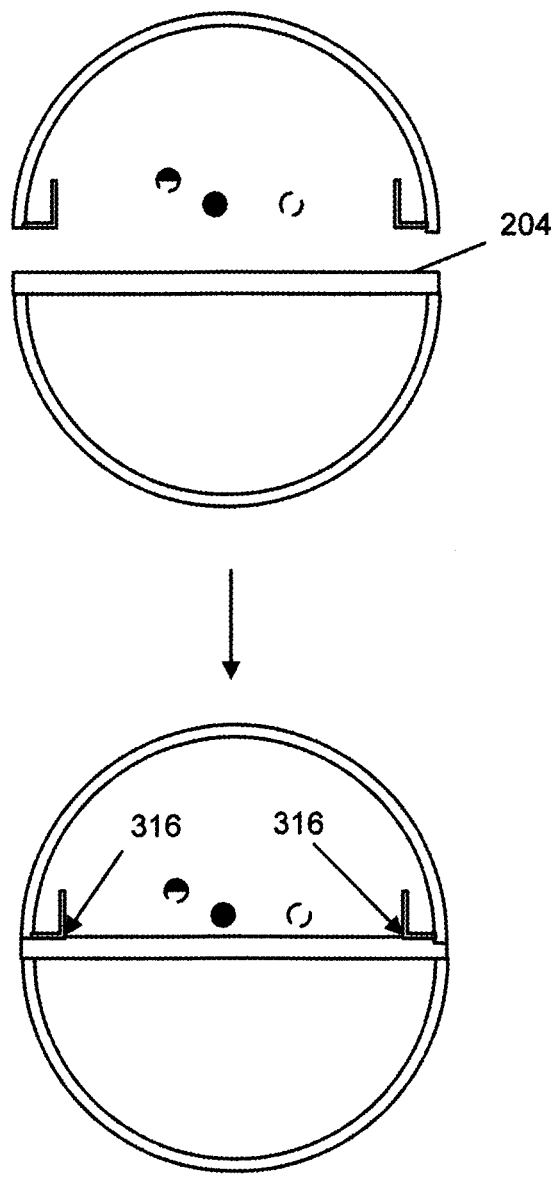
FIG. 3C is a cross section of the top section and bottom section being assembled.

FIG. 3A provides a cross section along line C-C' of FIG. 1 of the top section 300. FIG. 3B provides a cross section view of the top section 300 along line A-A' of FIG. 1. In use, water is introduced through input port 302 where it accumulates in liquid tray 304. The liquid tray 304 is a flat tray which may be a thermally conductive metal (e.g. aluminum) or an optically transparent material. In one embodiment, shown in FIG. 3B, the liquid tray 304 forms the bottom of the top section 300. In another embodiment, shown in FIG. 3C, the liquid tray 304 is formed by the cover 204 of the bottom section 200 by sealing a joint 316 with a suitable watertight sealant.

Figure 3D:
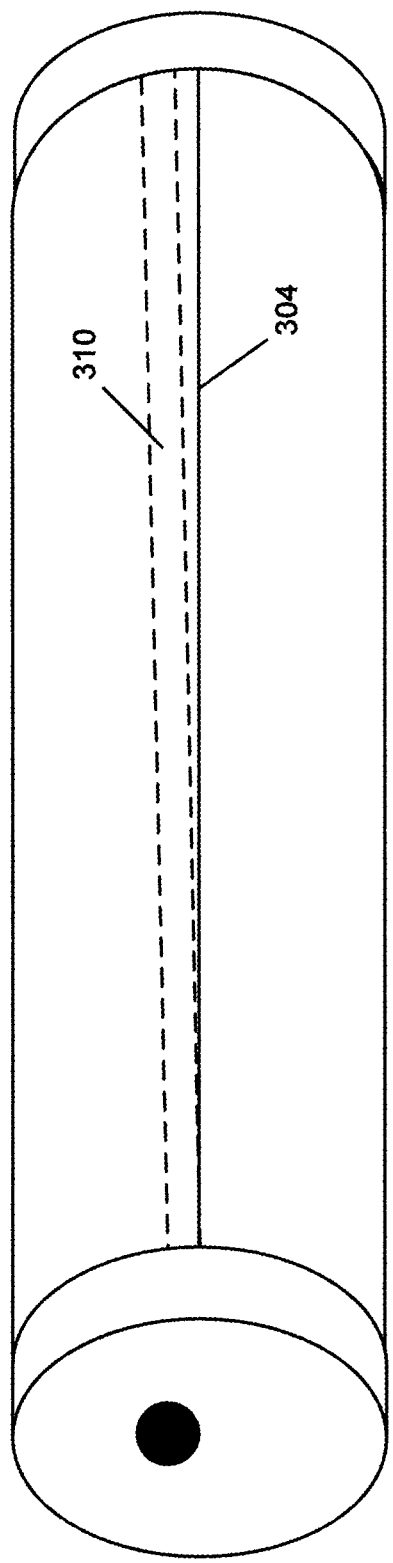
Figure 3E:
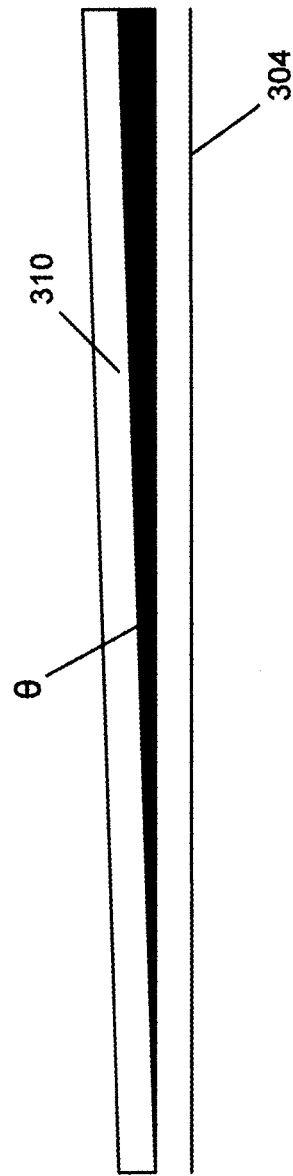
FIG. 3E is a profile view of the side-gutters showing an angle of offset.

In use, the light 208 (see FIG. 2A) heats the cover 204 which, in turn, heats the water in liquid tray 304. This causes a portion of the water to evaporate. The evaporated portion then condenses on an interior surface of a dome 308 (FIG. 3B) and accumulates in side-gutters 310. In one embodiment, the dome 308 is optically transparent. The side-gutters 310 extend the length of the top section 300 and are in fluid communication with a front-gutter 312. The side-gutters 310 and the front-cutter 312 extend perpendicular one another. In one embodiment, shown in FIG. 3D and FIG. 3E, the side-gutters 310 are inclined by an angle θ relative to the liquid tray 304. FIG. 3D is a phantom view of the side-gutters 310 and liquid tray 304 within the top section 300. FIG. 3E is a schematic profile showing the relative orientation of the side-gutters 310 and the liquid tray 304. The liquid tray 304 is roughly leveled such that water is generally contained. The angle θ guides water from the back of the side-gutters 310 toward the front-gutter 312. The angle θ may be greater than 0° and less than 60°. In one embodiment, the angle θ is greater than 0° and less than 45°. In another embodiment, the angle θ is greater than 0° and less than 20°. The output port 314 removes the condensed water from the front-gutter 312 for subsequent use. Excess water may be removed from the liquid tray 304 through an overflow port 306. In one embodiment, excess water is returned to the water reservoir 102.

Figure 4A:
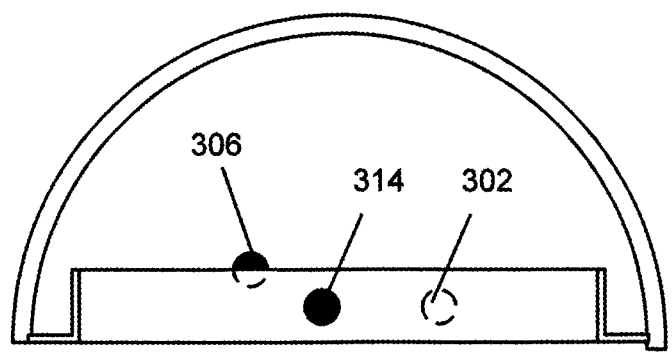
Figure 4B:
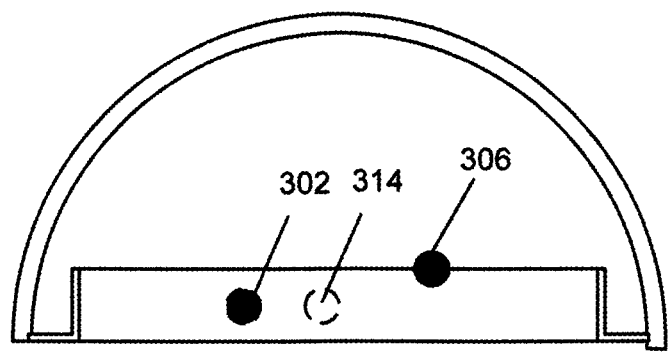
FIG. 4B is a corresponding cross section from the back.

As shown in FIG. 4A and FIG. 4B, the input port 302 and the overflow port 306 are vertically staggered. FIG. 4A depicts the device 100 from viewpoint D of FIG. 1. FIG. 4B depicts the device 100 from viewpoint E of FIG. 1. The input port 302 is vertically disposed below the top of the side-gutter 310. The overflow port 306 is above the input port 302 but at least partially below the top of the side-gutter 310 such that excess water in the side-cutter 310 will exit the overflow port 306 rather than introduce purified water back into the liquid tray 304.

Figure 4C:
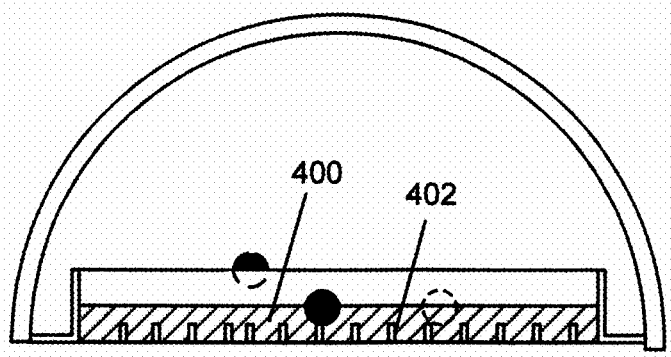
FIG. 4C is a cross section of the top section showing an absorbent material disposed within a liquid tray.
Figure 4D:
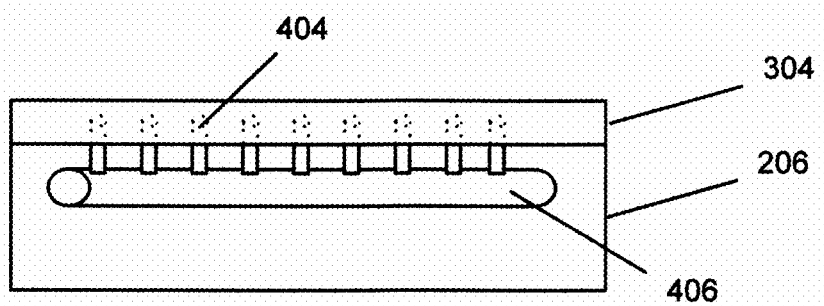
FIG. 4D is a cross section of the top section and the bottom section showing a horizontal tube in the bottom section and vertical tubes bridging between the top section and the bottom section.

In the embodiment of FIG. 4C, an absorbent material 400, such as an absorbent sponge, is provide that covers a bottom of the liquid tray 304. The absorbent material increases the exposed surface area of water within liquid tray 304 and facilitates evaporation. In the embodiment of FIG. 4C, the liquid tray 304 has a plurality of protrusions 402 extending from the bottom of the liquid tray 304 and increase the surface area of the bottom of the liquid tray 304. These protrusions 402 function as radiators and transmit heat to the surrounding medium with the increased surface area (either directly to the water or indirectly to the water by way of the absorbent material 400). In one embodiment, the protrusions 403 are elongated ribs that extend the length of the liquid tray 304. In another embodiment, the protrusions 403 are columns, such as spikes, that are arranged into rows. In one embodiment, shown in FIG. 4D, the bottom of the liquid tray 304 has a plurality of vertical metal tubes 404 (such as vertical copper tubes) that connect with one or more horizontal metal tubes 406 (such as a horizontal copper tube) that are suspended in the evacuated section 206. No water or other liquid need be contained within the horizontal metal tube 406, but the horizontal metal tube 406 absorbs heat from being suspended within the evacuated section 206. This heat transfers to the liquid tray 304 via the vertical metal tubes 404.

Figure 5A:
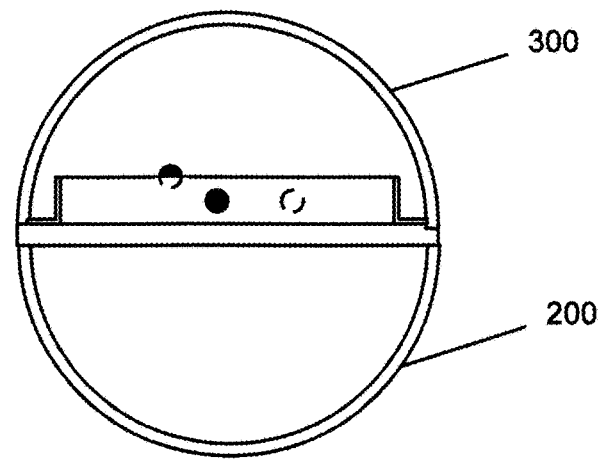
FIG. 5A, FIG. 5B and FIG. 5C are cross sections of the system showing different modes of connection between the top section and the bottom section.
Figure 5B:
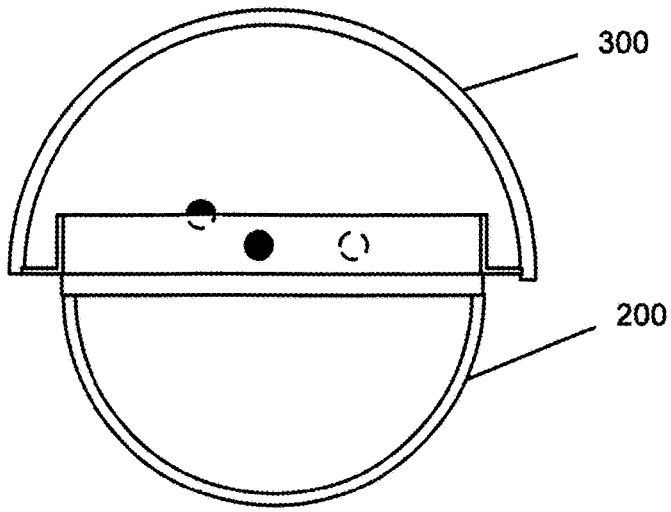
Figure 5C:
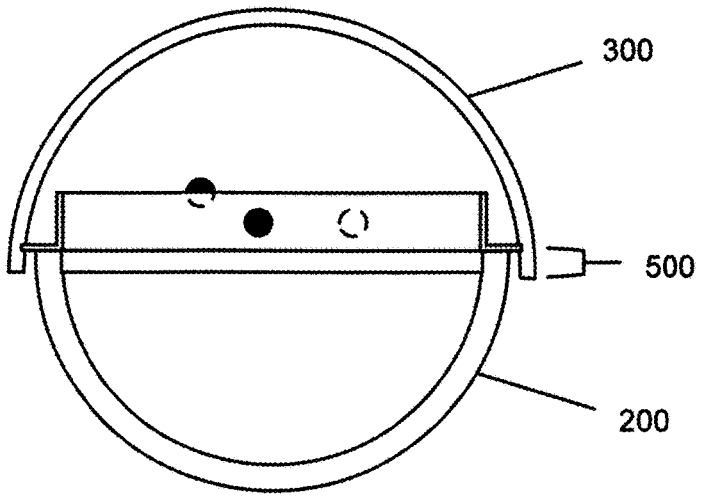

FIG. 5A, FIG. 5B and FIG. 5C depict alternative embodiments where the bottom section 200 and the top section 300 are mated in different configurations. In FIG. 5A, the bottom section 200 and the top section 300 are the same width. In FIG. 5B, the top section 300 is wider than the bottom section 200 such that the liquid tray 304 is formed by the cover 204 while the side-gutters 310 overhang. In FIG. 5C, the side-gutters 310 are also recessed by a distance 500 within the mouth of the optically transparent dome 308 to form a recessed lip. The bottom section 200 fits within the recessed lip to provide a sturdy connection.

Figure 6:
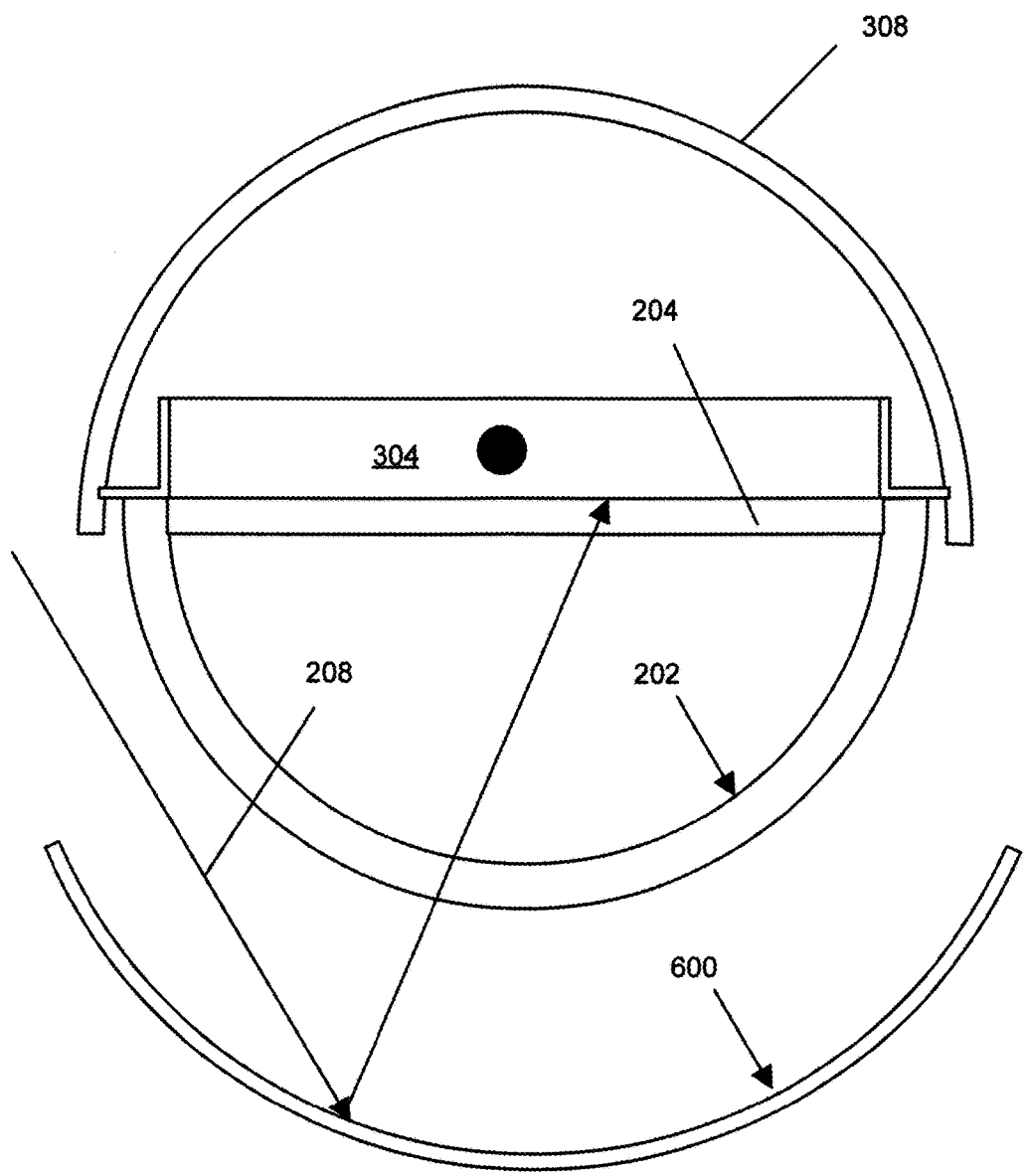
FIG. 6 is a cross section of the system showing the use of a parabolic mirror.

In one embodiment, a parabolic mirror is used to direct light toward the cover 204. FIG. 6 depicts the light 208 as it is directed by a parabolic mirror 600 and subsequently transmitted through the optically transparent bottom surface 202 to heat water in the liquid tray 304. In another embodiment, the light 208 is directed by an array of concave lenses. One such embodiment is shown in FIG. 7A.

Figure 7A:
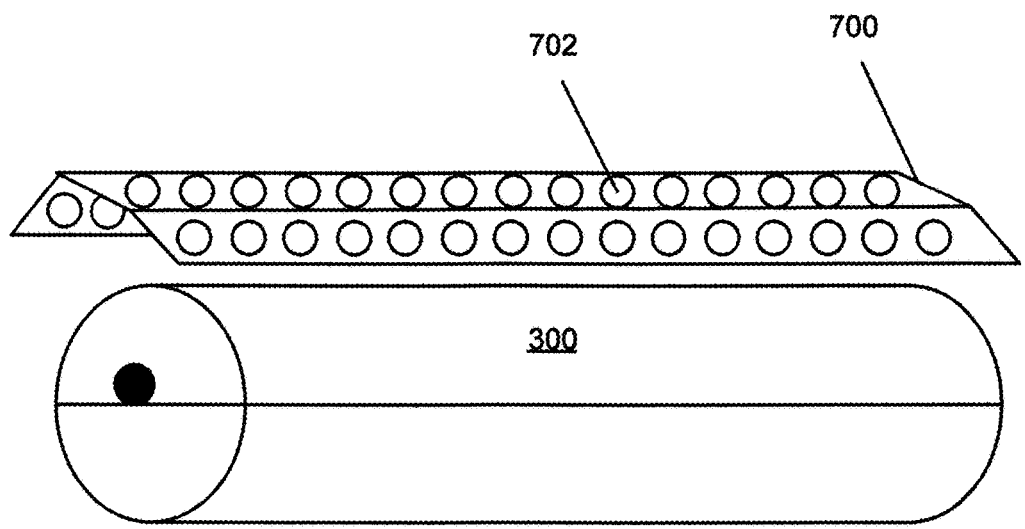
FIG. 7A is a perspective view of the system showing the use of an array of lenses.
Figures 7B, 7C:
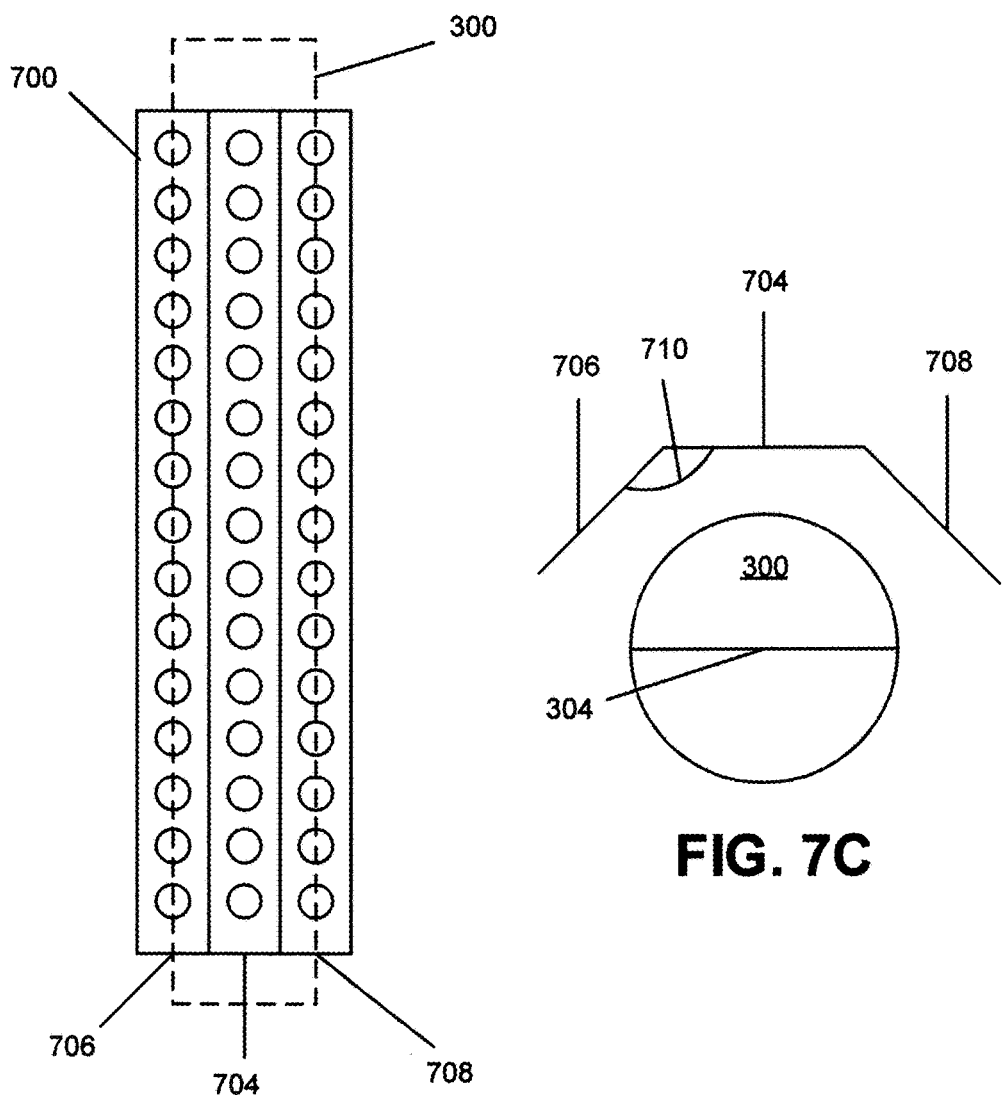

FIG. 7A is a profile view that depicts an array 700 of lenses 702 disposed above the top section 300. In the embodiment of FIG. 7A the top section 300 is optically transparent and the concave lenses 702 direct light into the top section 300 to facilitate evaporation. In another embodiment, the lenses 702 are Fresnel lenses. FIG. 7A provides a top view of the array 700. The array comprises a central panel 704 that is flanked by two side-panels 706, 708. As shown in FIG. 7B and FIG. 7C, each panel expends parallel the longitudinal axis of the top section 300. The central panel 704 extends parallel to the liquid tray 304 while the side-panels 706, 708 are offset from the plane of the central panel 704 by an angle 710 such that light is focused on the top section 300. The magnitude of the angle 710 varies with the diameter of the top section 300 but generally is less than 180° and greater than 90°. In one embodiment, lenses 702 are Fresnel lenses, concave lenses, concave parabolic Fresnel lenses, linear Fresnel lenses or convex parabolic Fresnel lenses.

Figure 8A:
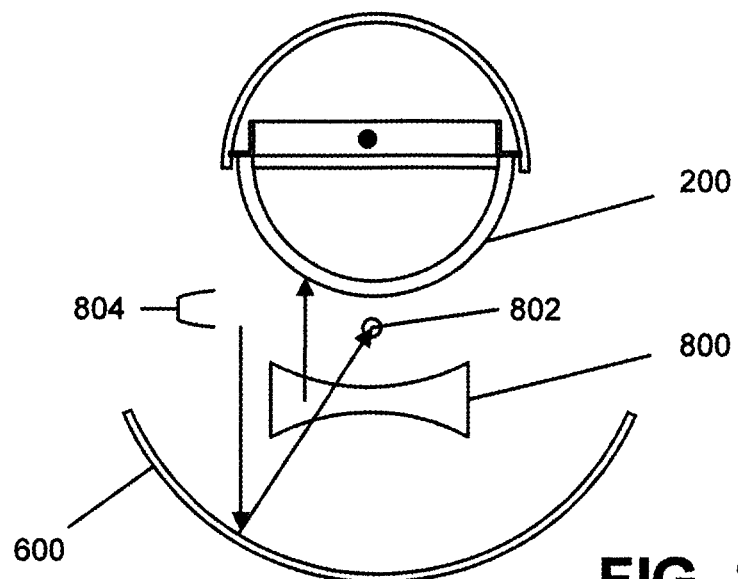
FIG. 8A is a cross section of the system showing the use of a lens between the parabolic mirror and the bottom section.

FIG. 8A depicts an embodiment that uses at least one lens between the parabolic mirror 600 and the bottom section 200. In one such embodiment, an array of lenses is utilized similar to the array 700. For simplicity of illustration, only a single lens is shown in the side view of FIG. 8A. The lens 800 is a parabolic biconcave lens that has a focal length that directs light to a focal point 802. The focal point 802 is spaced at a distance 804 from the bottom section 200.

Figure 8B:
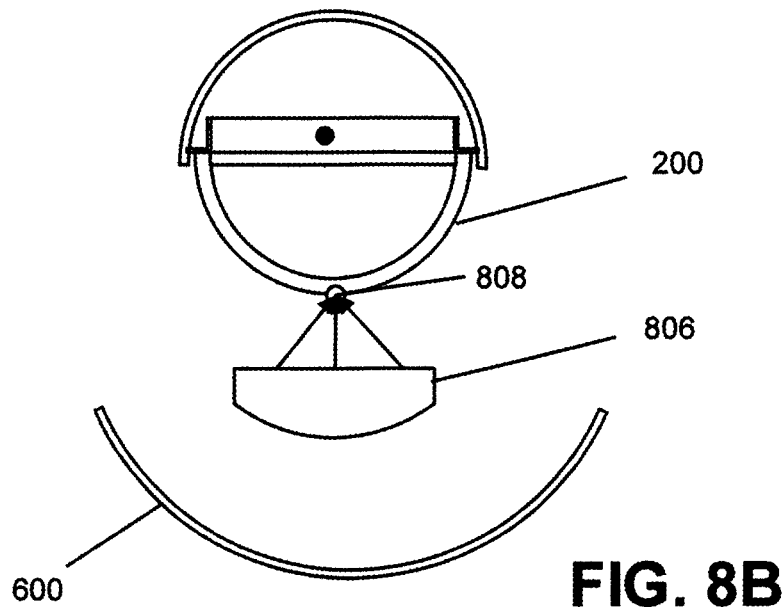
FIG. 8B is a cross section of another system showing the use of a lens between the parabolic mirror and the bottom section.

FIG. 8B depicts another embodiment that uses at least one lens between the parabolic mirror 600 and the bottom section 200. In FIG. 8B, a parabolic convex lens 806 is used that has a focal length that directs light to a focal point 808. The lens 806 is placed such that the focal point 808 coincides with the lower surface of the bottom section 200.

Figure 9:
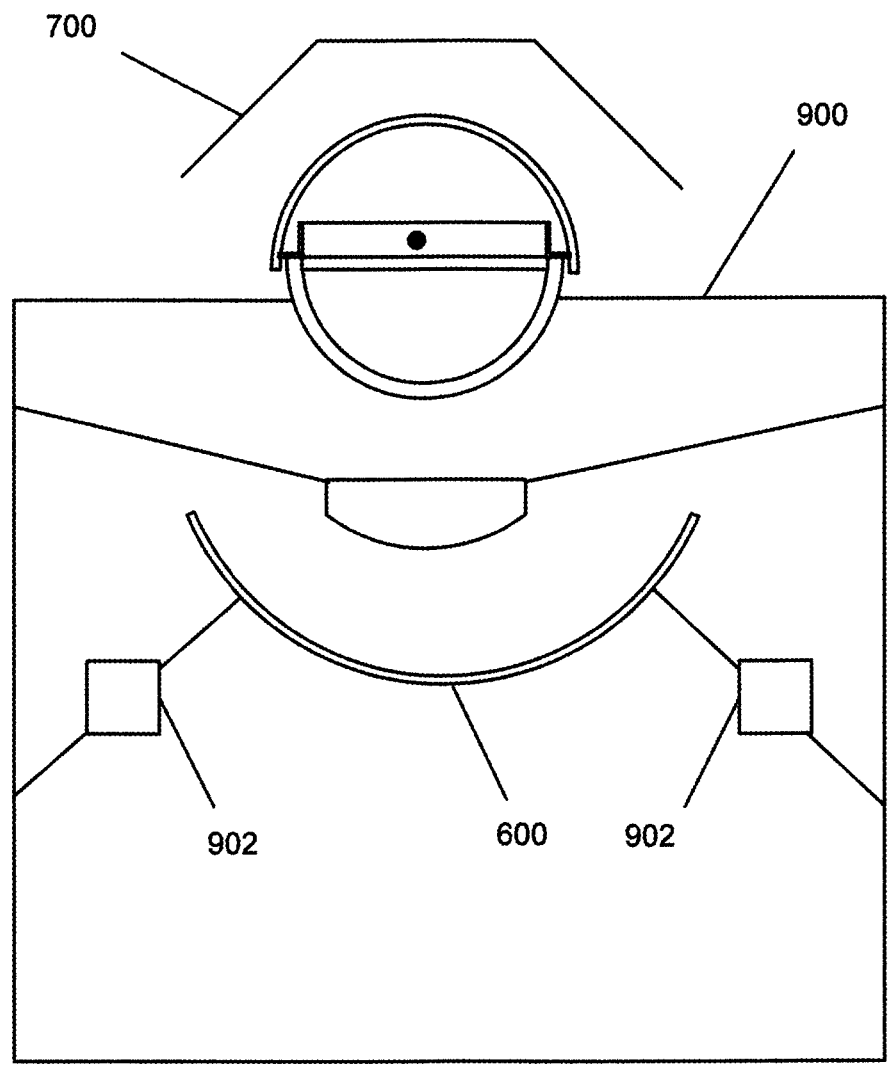
FIG. 9 is an end view of a system showing a frame with a motor for moving the parabolic mirror.

As shown in FIG. 9, in one embodiment, the water purifying device 100 is supported on a frame 900 that allows rotation of the parabolic mirror 600 to track sunlight. The frame 900 provides a supporting scaffold that permits light to contact the device. In one embodiment, the frame 900 comprises at least one self-adjusting motor 902. The self-adjusting motor 902 may be solar powered and is configured to re-position the parabolic mirror 600 to track the sun as the sun moves.

In another embodiment, an optimal concentration solar distillation system is proposed that employs a linear solar thermal concentration with adaptive focal point (e.g., linear and parabolic Fresnel system). The solar water distiller is portable, scalable, and of high production. Specifically, the solar water distiller takes advantage of linear concentration and optimizes water production in the absorbing chamber. Unlike the conventional and compound parabolic concentrator (CPC) systems, in the disclosed approach the absorber material receives energy from below and transfers the heat to the evaporation chamber. The evaporating surface may be treated to enhance the boiling process. Preliminary results have shown the production of up to three times more purified water than reported flat systems and up to two times more than reported CPC experiments. The energy savings are enormous when compared to the benchmark of the alternative of reverse-osmosis, where energy usage is about 5 kWhe per $m^3$.

Solar desalination systems are classified into direct and indirect collection systems. As their names imply, direct-collection systems use solar-energy to produce distillate directly in the solar collector, whereas in indirect collection systems, two subsystems are employed. Conventional desalination systems are similar to solar systems because the same type of equipment is applied. The primary difference is that in the former, either a conventional boiler is used to provide the required heat or mains electricity is used to provide the required electric power, whereas in the latter, solar energy is applied. More specific studies include a hemispherical solar still, pyramid solar still, double-basin solar still, triple basin solar still, multiple basin solar still, inverted absorber solar still, tubular solar stills, compound parabolic concentrator (CPC) solar still, weir-type cascade solar still, wick-type, inverted absorber solar still, portable active solar still, integrated basin solar still with a sandy reservoir, titled wick-type with flat plate bottom reflector, fin, active vibratory solar still, and a plastic solar still.

Figure 10:
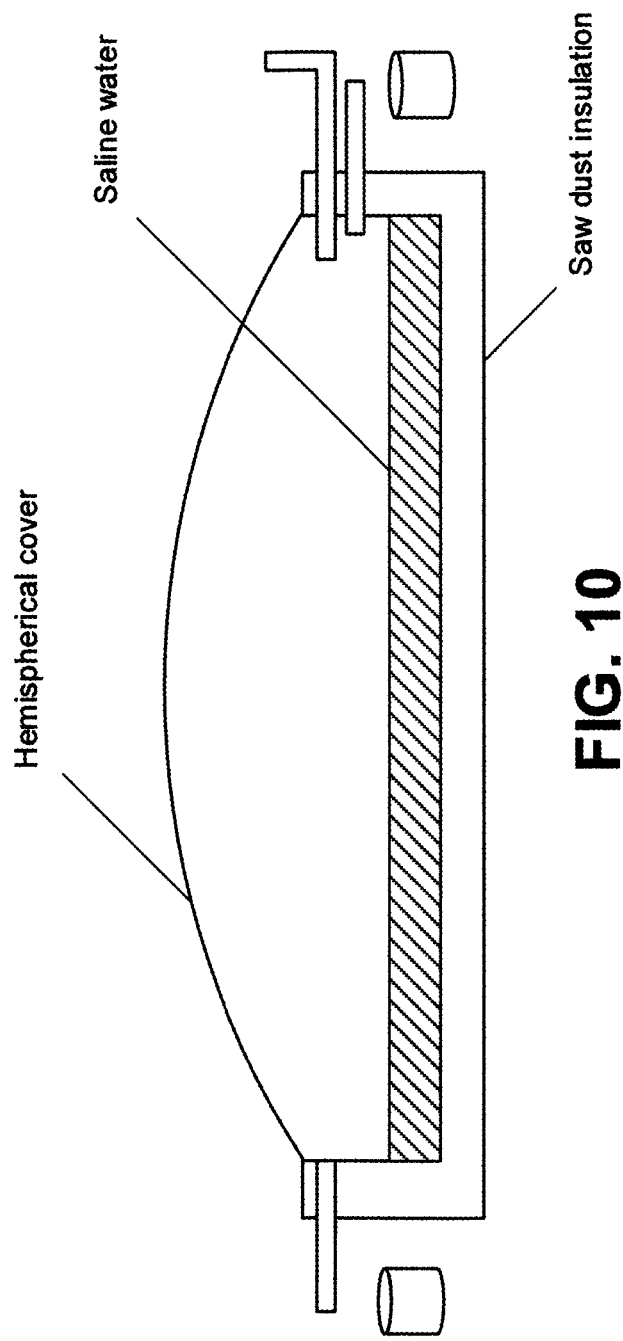
FIG. 10 shows the basic configuration of a flat collector solar distillation system.

The principle of pure water production from saline water consists in allowing saline water through an absorbing surface of the solar radiation that is transmitted through a transparent cover. Thus, the saline water is heated up until it evaporates. The water vapor density of the humid air increases due to evaporation from the water surface. The water vapor condensed at the inner surface of the cover, releases its latent heat due to evaporation. Finally, the condensed water trickles down due to gravity and is stored in a collector. FIG. 10 shows the basic configuration of a flat collector solar distillation system, while Table 1 shows corresponding production for this type of flat solar stills in terms of clean water produced per day per unit area of the still, with maximum production close to 3,000 mL per day per square meter.

TABLE 1

| Still | Construction System | Area ($m^2$) | Cost US ($/m^2$) | Average Yield ($L/m^2/d$) |
|---|---|---|---|---|
| A | Aluminum double surfaced | 8.9 | 118 | 2.5 |
| B | Aluminum double surface | 11.1 | 101 | 2.5 |
| D | Galvanized mild steel | 4.5 | 79 | 2.5 |
| E | Galvanized mild steel | 4.5 | 79 | 1.9 |
| F | Aluminum | 2.2 | 101 | 2.2 |
| G | Aluminum | 2.2 | 182 | 2.8 |
| CC | Concrete | 1.9 | 7.2 | 1.8 |

Figure 11:
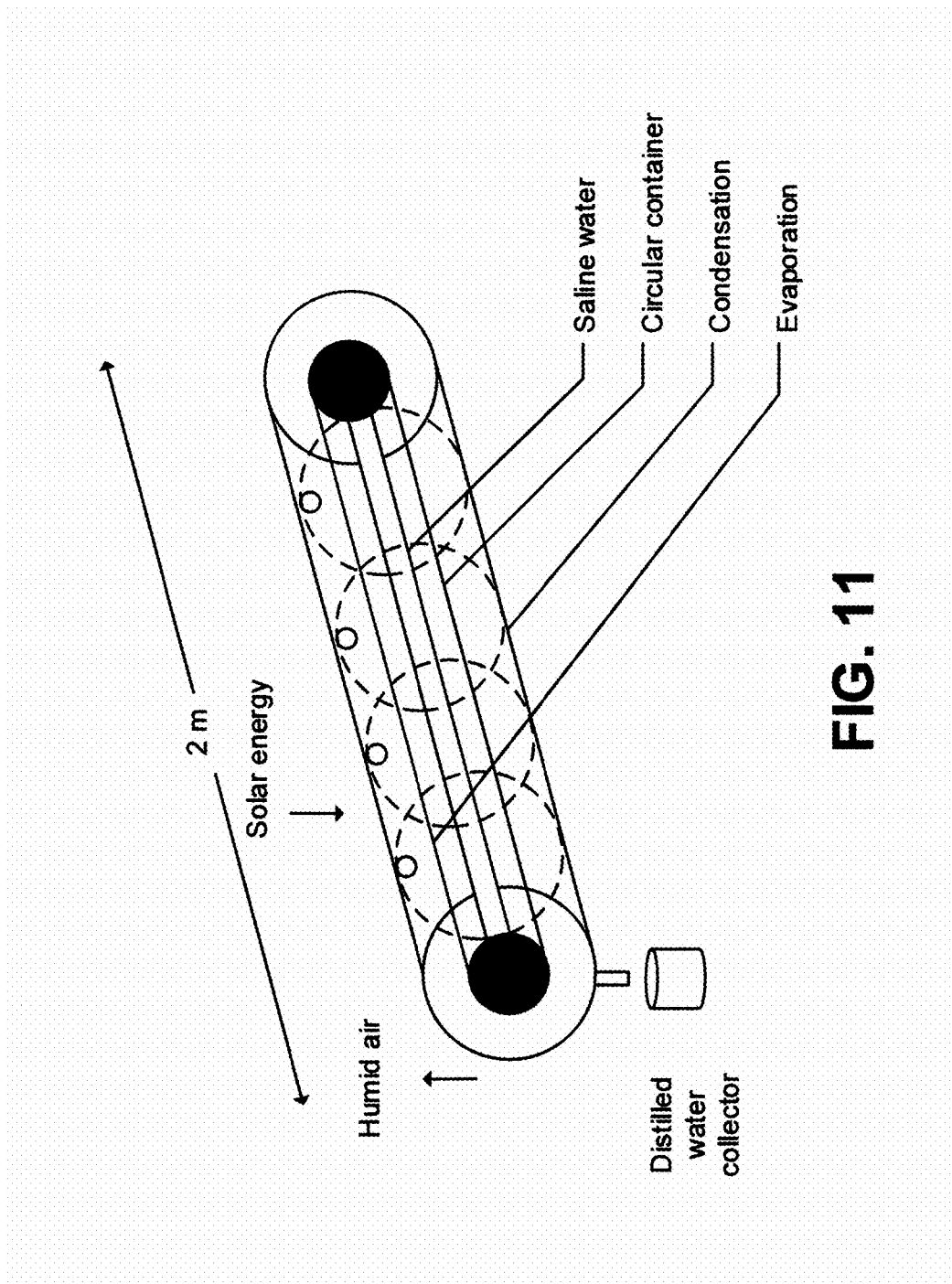
FIG. 11 shows solar powered water purification system that uses solar concentration technology.
Figure 12:
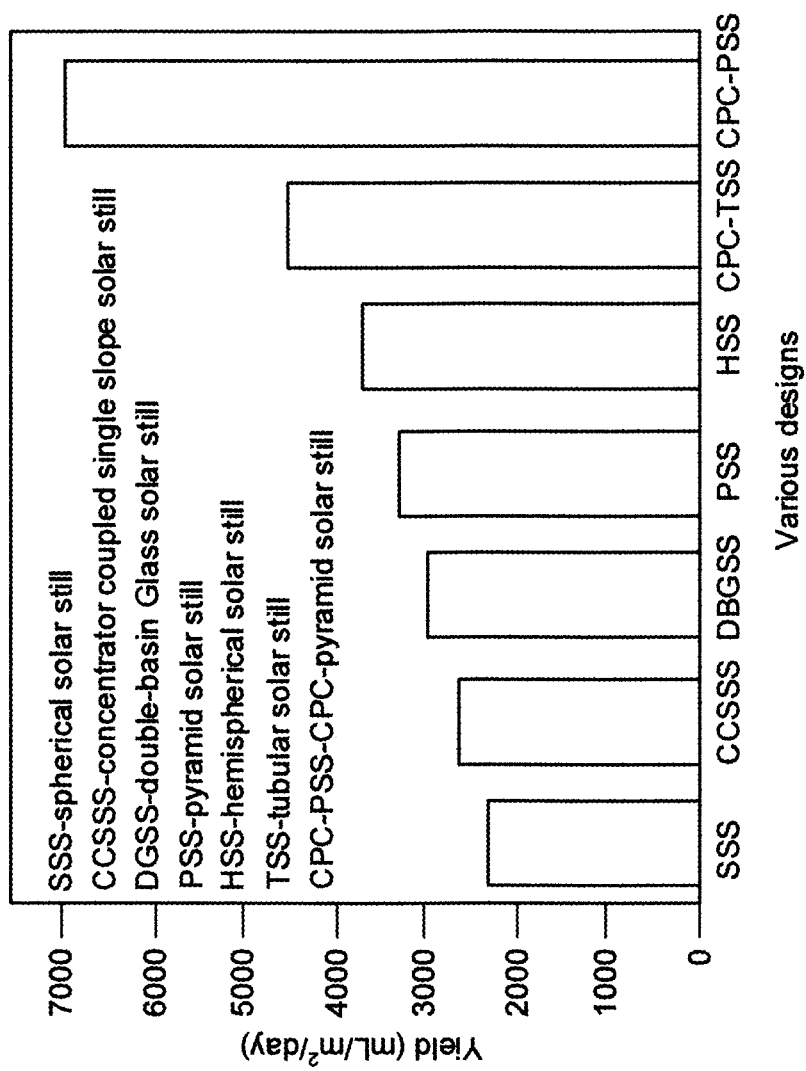
FIG. 12 is a graph depicting water flow production for various water purification systems.

Recent designs for solar water distiller systems have evolved to use solar concentration technology (FIG. 11), where production of water can be as high as twice that of traditional flat technology. Arunkumar et al. (T. Arunkumar,1 K. Vinothkumar,2 Amimul Ahsan,3 R. Jayaprakash,1 and Sanjay Kumar, 2010. Experimental Study on Various Solar Still Designs, ISRN Renewable Energy, Vol. 2012, 10 pages) recently researched production of different configurations of hemispherical concentration, linear concentration, and compound parabolic concentration (CPC) solar stills and summarized daily production, and results are replicated in FIG. 12. It is clearly evident that production using CPC shows the largest potential. CPC are low concentration devices where the light is concentrated on a flat receiver as opposed to a focal point, allowing for concentration of sunlight under partial cloudy skies, or large acceptance angle. Typical concentrations of CPC are in the range of less than 10×.

We assert from these past studies and our own experiences, that there is large potential in linear concentration with adaptive concentration point. We thus propose a water distillation system using linear solar thermal concentration with adaptive focal point. Disclosed herein is an evolutionary SDW that is portable, scalable, and of high production. This system takes advantage of linear concentration, and optimize water production in the absorbing chamber. The absorber material received energy from below, transferring the heat to the evaporation chamber. This is a radical diversion from traditional linear concentration where the evaporation chamber is the same as the absorbing surface. The heat transfer section can be optimized by using vacuum technology, while the evaporation chamber can benefit from enhanced surfaces. As a pilot study, basic units were build and used in preliminary testing, with production of up to 3× from reported flat systems, and up to 2× from the reported CPC experiments. The expected energy savings are enormous when compared to the benchmark of the alternative of reverse-osmosis, where energy usage is about 5 kWhe per $m^3$.

Design and Optimization of a Concentration System:

To optimize the linear concentration, a linear Fresnel system was implemented with optimal control, similar to that use for compact heat and power technologies. This optimal control strategy uses a series of linear Fresnel systems, individually controlled to maintain a common focal point. This is similar to the array 700 except in that each lens is individually controllable to provide the common focal point. The focal point is found based on the maximum temperature of the focal point (the receiver), using a temperature sensor. Each Fresnel lens is moved independently until a maximum temperature is found. The maximum temperature in the absorbent plate is a fundamental variable considering that evaporation occurs at a nearly constant temperature. In one embodiment a maximum temperature of less than 150° C. is produced, subject to loss coefficient factor, optimal flow of water, and local ambient conditions. This open feedback control strategy is far superior to closed loop control strategies that are based on solar tracking equations.

Figure 14A:
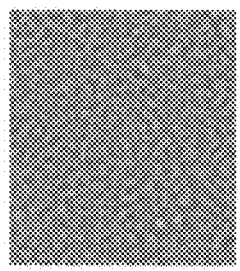
FIG. 14A, FIG. 14B and FIG. 14C depict surface roughness of several surfaces.
Figure 14B:
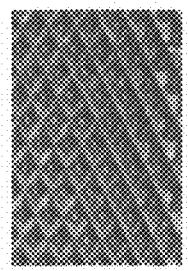
Figure 14C:
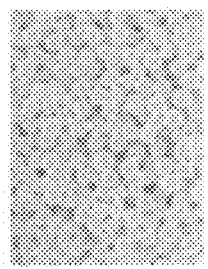
Figure 13:
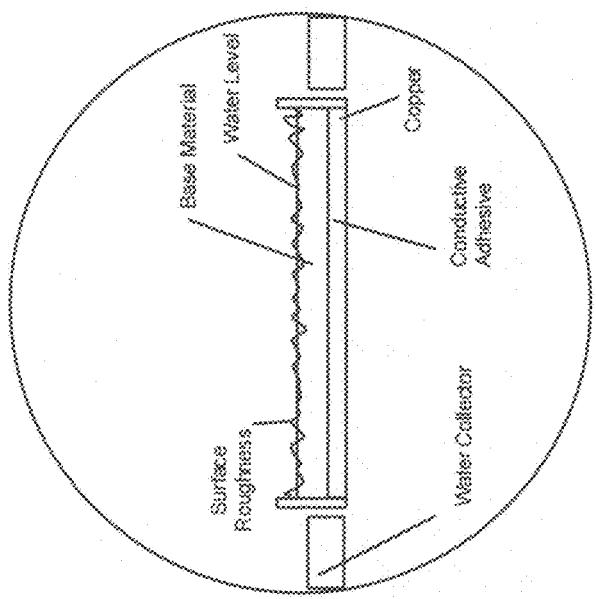
FIG. 13 is a cross section of another system showing the use of a conductive adhesive.

Design and Optimization of Dual Use Surface and Evaporation Process:

In one embodiment, a dual surface is manufactured for enhanced solar energy gain and surface evaporation. The surface comprises absorbing material, conductive separate substrate, bonding, and enhanced evaporative surface. Potential base materials include copper and aluminum coated with solar absorbing material on one side, and a surface treated to increase evaporation in the other side separated by thermally conductive base. A common high performance solar absorbing material used in solar thermal collectors is TINOX®, a copper based thermal paste with high solar absorption (greater than 93%) and low infra-red emissivity (less than 5%), which overall maximizes solar absorption and reduces thermal losses by radiation heat transfer. The schematic of dual surface, surface roughness and the water level in the tube is shown in FIG. 13. The samples of the surface roughness methods are shown in FIG. 14A, FIG. 14B and FIG. 14C. In one embodiment sand-blasting alone (FIG. 14A) suffices for the purpose of distilling water. In other embodiments, knurling (FIG. 14B) or sintering beads (FIG. 14C) are used.

A highly conductive adhesive (thermal paste) material may be used to bond the absorbing TINOX® surface to the base material. See FIG. 14. In one embodiment aluminum or copper base material is used to test performance while considering the impact of costs. The thickness of the base material is a few (e.g. 1-5) millimeters and will be treated for enhance evaporation in the evaporating chamber. There are several methods to increase evaporation of water and thus increase output of purified water. Most methods rely on increasing surface roughness of the metal plate. Increasing surface roughness of a heated plate increases the surface boiling heat transfer (BHT) and critical heat flux (CHF) significantly.

Figure 15:
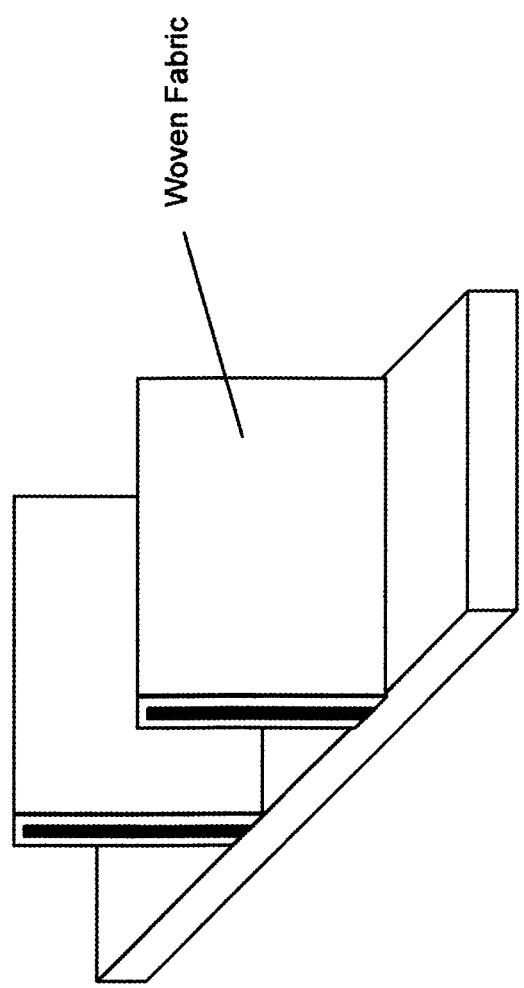
FIG. 15 illustrates vertical metal strips on the base material that are draped with woven cotton fabrics.

In some embodiments, to increase surface roughness and evaporation process, the following methods for increasing the efficiency of the output of purified water, manufacturability and costs are used. These include (a) applying a thin film coating to the surface. (See Eric Forrest, Erik Williamson, Jacopo Buongiomo, Lin-Wen Hu, Michael Rusner, and Robert Cohen, Augmentation of nucleate boiling heat transfer and critical heat flux using nanoparticle thin-film coatings, International Journal of Heat and Mass Transfer, Vol. 53, pp. 58-67, 2010); (b) modifying the surface by creating horizontally oriented surfaces to create roughness. (See Kuang-Han Chu, Ryan Enright and Evelyn N. Wang, Structured surfaces for enhanced pool boiling heat transfer, Applied Physics Letters, 100, pp. 1-5, 2012); (c) adding metal nanoparticles to the water, creating a "nanofluid". The nanoparticles help boiling and evaporation (see S. M. You, J. H. Kim and K. H. Kim, Effect of nanoparticles on critical heat flux of water in pool boiling heat transfer, Applied Physics Letters, Volume 83, pp 3374-3376, 2003); (d) creating roughness on the surface by sand-blasting the metal surface, knurling the surface and sintering micro-beads to the surface. (e) using capillary action to increase the rate of water evaporation. In one embodiment, a series of vertical metal strips is installed on the base material and draped with woven cotton fabric where the bottom sections of the fabric are immersed in the water on the base material. The vertical metal strips extend perpendicular to the base material. See FIG. 15. Because of the capillary action, the water moves up the woven fabric and creates a large surface area which significantly increases the evaporation process.

Manufacturing:

As a pilot study a Linear Elliptical Water Purification System, known as Linear Tube System (LTS) was manufactured with the longitudinal cross-sectional area of 48"× 8.5", including a sun light reflector below the tube. The water was fed through a controlled valve from the top end of the LTS and with the gentle slope of LTS the purified water was collected at the lower end. In some embodiments, one or more Fresnel lenses may be added on the top of tube. Preliminary results—without any optimization of the system—revealed that on a sunny day in Central Florida t as much as 0.75 L of purified water could be collected and, on a semi cloudy day, 0.5 L of water were collected.

Cost Optimization:

The cost of the unit can be reduced using reverse osmosis (RO) as a benchmark. Water distillation of RO costs are estimated in $0.001 per L in energy costs, with additional equivalent costs for installation and O&M.

Figure 16:
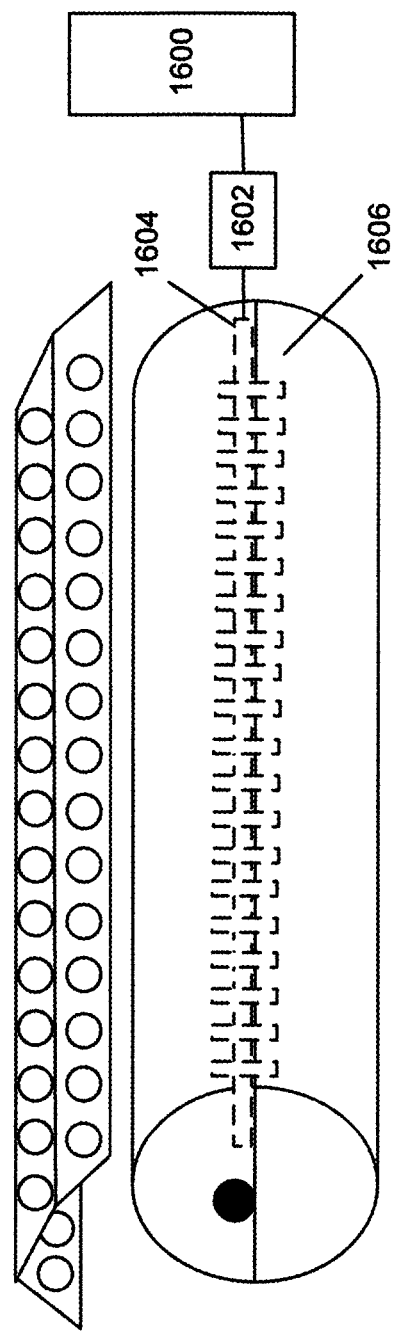
FIG. 16 depicts an embodiment that has a rotating axil with evaporation disks attached to the axil.

FIG. 16 depicts an embodiment that includes a photovoltaic panel 1600 that powers a solar motor 1602 which rotates an axil 1602. In one embodiment, a solar battery is included that is charged using the photovoltaic panel 1600. The solar battery permits use of the system in a low-light environment (e.g. at night). The axil 1602 has a plurality of evaporation disks (e.g. screens or wires with a nanocoated surface). The evaporation disks rotate are partially exposed above the surface of the water in the liquid tray (e.g. liquid tray 304). Water is drawn into the evaporation disks and subsequently evaporates. The rotation facilitates vaporization. The bottom section (e.g. bottom section 200) may be formed of an opaque metal and is configured to receive the axil 1602 such that the axil 1602 can rotate. The solar motor 1602 may be attached to the back end of the bottom section 200. Water is fed to the liquid tray by a water flow regulator (e.g. a float valve).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device for purifying water by solar power, the device comprising:
    a bottom section and a top section, each being horizontal cylindrical segments contacting one another along a respective flat edge to provide an elongated cylinder;
    the bottom section comprising a cover that defines the flat edge of the bottom section;
    a liquid tray that defines the flat edge of the top section, at least one side-gutter that directs water that condenses on an interior surface of the top section to an output port, the liquid tray further comprising an input port for adding water into the liquid tray
    an axle extending along a length of the elongated cylinder and parallel to the flat edge, the axle comprising a plurality of evaporation disks that are orientated perpendicular to the axle, the evaporation disks extending both into the water in the liquid tray and above the water in the liquid tray;
    a motor configured to rotate the axle.

2. The device as recited in claim 1, further comprising a water reservoir that supplies water to the input port.

3. The device as recited in claim 2, further comprising a water flow regulator that regulates flow of water from the water reservoir to the input port.

4. The device as recited in claim 1, the liquid tray further comprising an overflow port that is disposed above the input port and above the output port, but below a wall that defines the side-gutter.

5. The device as recited in claim 1, further comprising a photovoltaic panel that powers the motor.

6. The device as recited in claim 5, further comprising a solar battery that stores energy from the photovoltaic panel and supplies power to the motor.

7. The device as recited in claim 1, further comprising an absorbent material disposed within the liquid tray.

8. The device as recited in claim 7, wherein the liquid tray comprises a plurality of vertical metal strips extending perpendicular to the flat edge, the absorbent material being disposed on the plurality of vertical metal strips.

9. A device for purifying water by solar power, the device comprising:
    a bottom section and a top section, each being horizontal cylindrical segments contacting one another along a respective flat edge to provide an elongated cylinder;
    the bottom section comprising a cover that defines the flat edge of the bottom section;
    a liquid tray that defines the flat edge of the top section, the liquid tray being flanked by side-gutters that direct water that condenses on an interior surface of the top section to a front-gutter and through an output port, the side-gutters and the front-gutter at least partially circumscribing the liquid try, the liquid tray further comprising an input port for adding water into the liquid tray;
    an axle extending along a length of the elongated cylinder and parallel to the flat edge, the axle comprising a plurality of evaporation disks that are orientated perpendicular to the axle, the evaporation disks extending both into the water in the liquid tray and above the water in the liquid tray;
    a motor configured to rotate the axle.

10. The device as recited in claim 9, the liquid tray further comprising an overflow port that is disposed above the input port and above the output port, but below a wall that defines the side-gutter.

11. The device as recited in claim 9, further comprising a frame supporting the device and a parabolic mirror also supported by the frame, the parabolic mirror being below the bottom section to reflect light to the bottom section.

12. The device as recited in claim 11, further comprising at least one lower lens disposed between the parabolic mirror and the bottom section.

13. The device as recited in claim 12, wherein the lower lens is a Fresnel lens.

14. The device as recited in claim 12, wherein the lower lens is a parabolic biconcave lens.

15. The device as recited in claim 12, wherein the lower lens is a parabolic convex lens.

16. The device as recited in claim 9, further comprising an absorbent material disposed within the liquid tray.

17. The device as recited in claim 9, wherein the device further comprises at least one lens and the top section has an optically transparent dome, the at least one lens focusing light through the optically transparent dome.

18. The device as recited in claim 17, wherein the at least one lens is a Fresnel lenses.

19. The device as recited in claim 17, wherein the optically transparent dome is acrylic.

20. A device for purifying water by solar power, the device comprising:
- a bottom section and a top section, each being horizontal cylindrical segments contacting one another along a respective flat edge to provide an elongated cylinder;
- the bottom section comprising a cover that defines the flat edge of the bottom section;
- the top section comprises an optically transparent dome;
- a liquid tray that defines the flat edge of the top section, the liquid tray being flanked by side-gutters that direct water that condenses on an interior surface of the optically transparent dome to a front-gutter and through an output port, the side-gutters and the front-gutter at least partially circumscribing the liquid tray, the liquid tray further comprising an input port for adding water into the liquid tray;
- an array of lenses disposed above the top section;
- an axle extending along a length of the elongated cylinder and parallel to the flat edge, the axle comprising a plurality of evaporation disks that are orientated perpendicular to the axle, the evaporation disks extending both into the water in the liquid tray and above the water in the liquid tray;
- a motor configured to rotate the axle.

* * * * *